3,193,544
OPTICALLY ACTIVE POLYMERIC ALPHA OLEFINS AND PROCESSES FOR MAKING SAME
Giulio Natta, Milan, and Piero Pino and Gian Paolo Lorenzi, Pisa, Italy, assignors to Montecatini Società Generale per l'Industria Mineraria e Chimica, a corporation of Italy
No Drawing. Filed Jan. 15, 1960, Ser. No. 2,607
Claims priority, application Italy, Jan. 15, 1959, 731/59
12 Claims. (Cl. 260—93.7)

This invention relates to polymeric alpha-olefins which are optically active in solution, and to process for producing them. More particularly, the invention relates to crystallizable polymeric alpha-olefins having isotactic structure to amorphous (atactic) non-crystallizable polymeric alpha-olefins, which polymers are optically active in solution, and to processes for producing the same.

The new optically active polymers of our invention can be obtained by polymerization, under conditions as described below, of optically active alpha-olefins having the general formula $$CH_2=CHR$$

in which R is a branched alkyl radical containing 4 to 8 carbon atoms at least one of which is an asymmetric carbon atom, or in which R is an alkylaryl radical in which the alkyl portion contains 2 to 8 carbon atoms at least one of which is an asymmetric carbon atom.

Alternatively, we can obtain new optically active polymers by starting with optically inactive alpha-olefins such as propylene; butene-1; 3-methyl butene-1; styrene, alkyl-styrenes, 3-methyl pentene-1, racemic 4-methyl-hexene-1 and so on, an polymerizing the same in contact with a catalyst prepared from an optically active organometallic component.

As is known, the isotactic polymers which have been obtained previously from optically inactive alpha-olefins, do not exhibit optical activity in solution. This results from the fact that those known isotactic polymeric alpha-olefins consist of macromolecules which must be regarded as compounds having a meso structure and the low optical activity which could be predicted for each of such macromolecules due to differences in the end groups is balanced by the optical activity of opposite sign which is exhibited by other macromolecules present in the polymers. Those known isotactric polymers behave, in solution, as racemic substances.

An object of this invention is the new polymeric alpha-olefins, which may be isotactic and crystallizable, and which exhibit optical activity in solution.

Another object is to provide methods for producing the optically active polymers either from optically active alpha-olefins from optically inactive alpha-olefins.

Surprisingly, we find that we can obtain polymers which exhibit pronounced optical activity in solution by polymerizing the optically active alpha-olefins as defined above in contact with catalysts obtained by mixing compounds of transition metals belonging to Groups IV–VI inclusive of the Mendeleeff Periodic Table with organometallic compounds of the elements of Groups I–III inclusive of said table, for example, by mixing titanium trichloride or tetrachloride with aluminum triisobutyl.

The very high rotary power exhibited by our new polymers cannot be attributed only to the asymmetrical carbon atoms present in the side chains.

This very pronounced rotatory power exhibited by our polymers can be explained by assuming that the polymer macromolecules retain their spiralized form in solution and that one of the two forms of spiralization prevails, thus contributing substantially to the optical activity of the polymer solutions.

The optically active alpha-olefins which can be polymerized in accordance with our invention to polymerizates which exhibit marked optical activity in solution include (+)(S)-3-methyl-pentene-1* 
(—)(S)-4-methyl-hexene-1
(+)(S)-5-methyl-heptene-1
(+)-3-phenyl-pentene-1
(+)-3-methyl-hexene-1
(+)-3-methyl-heptene-1
(+)-4-phenyl-pentene-1
(+)-3-phenyl-hexene-1
(+)-4-phenyl-hexene-1
(+)-5-phenyl-hexene-1

* The Symbol "S" in designating the optically active compounds, was proposed by Cahn, Ingold and Prelog (Experientia 1956, 12, 81) and has been already adopted in Beilstein's Handbuch der Organischen Chemie.

or other optical antipodes.

We find further, and as a modification of our invention, that we can obtain polymers which exhibit optical activity in solution, from optically inactive alpha-olefins, by polymerizing the latter in solution in contact with catalysts prepared by mixing the transition metal compounds with optically active organometallic compounds having the formula $$MeR'_n$$

where Me is a metal belonging to Groups I to III, inclusive, to the Mendeleeff Periodic Table, $n$ is a whole number corresponding to the valence of said metal, and R' is a hydrocarbon radical containing at least one asymmetric carbon atom.

In the formula $MeR'_n$ for the optically active organometallic component of the catalyst, Me is preferably Li, Mg, Be or Al, and R' represents, e.g., the radical 2-methyl-n·butyl, 3-methyl-n·pentyl, 3-phenyl-n·pentyl, 4-methyl-n·hexyl, 5-methyl-n-heptyl.

Among the optically active organometallic compounds which are useful as one catalyst forming component, we find that (+)-tris- [(S)-2-methyl-butyl] aluminum etherate is particularly effective. 

As solvents, for polymerizing the inactive monomers in solution are preferably used saturated aliphatic or aromatic hydrocarbons.

The optically active polymerizates obtained according to both modifications of our invention are mixtures of (1) highly crystallizable macromolecules the observed data for which corresponds to that of macromolecules substantially having an isotactic structure, (2) macromolecules comprising both crystallizable and non-crystallizable chain portions, and (3) amorphous (atactic) non-crystallizable macromolecules, all of which macromolecules exhibit optical activity in solution.

The sterically differentiated macromolecules contained in the crude optically active polymerizates can be separated from each other by fractional dissolution on the basis of their differences in steric structure. The organic solvents to be used in such fractionation will vary with the starting monomer, and for each solvent the amorphous (atactic) macromolecules and the partially crystallizable macromolecules are more soluble than the highly crystallizable polymers. The isotactic (crystallizable) macromolecules can be separated by treating the polymerizate with solvents such as aliphatic ketones or esters, which remove, selectively, the amorphous macromolecules, and then treating the residue of that treatment with a solvent such as an aliphatic ester or ether which dissolves the partially crystallizable macromolecules, leaving the highly crystallizable macromolecules as residue, which may be soluble in aliphatic ethers or in hydrocarbons. Solvents for the partially crystallizable macromolecules also dissolve the amorphous (atactic) macromolecules so that, if desired, both of those types of macromolecules can be extracted simultaneously by treating the polymerizate with a solvent for the partially crystallizable macromolecules.

The crystallizable polymers obtained from the optically active monomers, and which exhibit optical activity in solution, show, in general in the solid state, a much higher crystallinity that the corresponding polymers obtained from the racemic monomers and which are optically inactive in solution. On the other hand, the melting points of the two types of polymers (optically active and optically inactive) are not very different.

We have found that, under the same polymerization conditions, the optically active alpha-olefins polymerize more readily than the racemic olefins. For example, operating at room temperature, we have obtained polymers of (S)-4-methyl-hexene-1 with high conversions, whereas under the same conditions only traces of polymer are obtained from the racemic 4-methyl-hexene-1.

As a result of the very high crystallinity exhibited by our new optically active polymeric alpha-olefins in the solid state, those polymers are particularly suitable for the production of self-supporting films and all-purpose textile fibers having a very high mechanical strength.

The following examples are given to illustrate our invention, it being understood that these examples are not intended to be limiting.

EXAMPLE 1

3.38 g. $Al(i=C_4H_9)_3$, previously distilled under vacuum, were introduced while stirring into a 100 ml. flask containing 0.88 g. $TiCl_3$ (obtained by reducing $TiCl_4$ with $H_2$) provided with a reflux condenser; the upper end of the flask being connected, through $CaCl_2$-towers, with a gasholder filled with pure $N_2$. The molar ratio $Al(i=C_4H_9)_3/TiCl_3$ was about 3.

The temperature was regulated by an oil bath in which the flask was immersed during the polymerization.

When the preparation of the catalyst was completed, 6.92 g. of (+)(S)-3-methyl-pentene-1 was introduced under nitrogen, into the flask.

Methanol, cooled in coils immersed in an ice-salt refrigerating mixture, was circulated in the cooler during the polymerization in order to prevent olefin losses (boiling point 54° C.).

The polymerization was carried out at an average temperature of 80° C.

As the polymerization proceeded, the agitation was more and more hindered until it ceased completely; the mass was heated until the reflux disappeared and was then stopped. While strongly cooling the flask with ice-salt, 50 cc. absolute ethyl alcohol were then added in small portions under nitrogen.

The mass was poured into a 1 liter flask where it was refluxed under nitrogen for some hours with 200–300 cc. 95% ethanol.

At the end of this treatment the polymer was white. It was filtered, the residue was collected and dried on a water bath under a pressure of 20 mm. Hg until a constant weight was reached.

Using 6.92 g. of the monomer, and after a polymerization time of 490 minutes, 3.16 g. of thus purified (+)poly-(S)-3-methyl-pentene-1 were obtained, the conversion on monomer used being 45.7%.

The crude polymer was further purified by treating it with hydrochloric acid and methanol.

The final polymer obtained was compared with a polymer obtained by starting with racemic 3-methyl-pentene-1.

The polymerization of racemic 3-methyl-pentene-1 was carried out with the same procedure as described above. 2.61 g. polymer were obtained in a polymerization time of about 515 minutes from 6.68 g. monomer, with a conversion of 39.1%.

Table I shows the results obtained by extracting the two different crude polymers with organic solvents. The extraction was carried out in a Kumagawa extractor.

Table I

| Fractions obtained | Polymer obtained from (+)(S)-3-methyl-pentene-1 | Polymer obtained from racemic 3-methyl-pentene-1 |
| --- | --- | --- |
| Acetone extract, percent | 1.6 | 3.5 |
| Ether extract, percent | [1] 4.9 | [1] 3.5 |
| Iso-octane extract, percent | [1] 2.8 | [1] 1.7 |
| Benzene extract, percent | [1] 4.9 | [1] 1.7 |
| Residue, percent | [2] 85.8 | [2] 89.6 |

[1] The sample shows low crystallinity.
[2] Highly crystalline.

The polymer fractions thus extracted were isolated by evaporating the solvent under reduced pressure and then dried on a water bath under a pressure of about 30 mm. Hg until the respective fractions had a constant weight. All fractions thus obtained were examined for their optical activity in decahydronaphthalene solutions with different dilutions.

Similar determinations were also carried out on polymer solutions obtained by heating with decahydronaphthalene the residue after benzene extraction in an oscillating autoclave (time 14 hours, average temperature 280° C.). This treatment was carried out in order to decrease the molecular weight of the polymer, thus increasing its solubility.

The apparatus used for determining the optical activity was a direct-reading Lippich's polarimeter, having a sensibility of 0.005°. All the fractions of the (+)(S)-3-methyl-pentene-1 polymer showed optical activity in solution as shown in Table II, in which the angles read on the polarimeter, as well as the approximate values of specific and molar rotations referred to the molecular weight of the monomeric unit, deduced therefrom, are given. All of the measurements reported in Table II were carried out in decahydronaphthalene.

Table II

| Analyzed fractions | Polymer not treated with HCl | | | | Purified polymer [1] | | | |
| --- | --- | --- | --- | --- | --- | --- | --- | --- |
|  | G./100 ml. | $\alpha_D^{25}$ $l=1$ | $[\alpha]_D^{27}$ | [2] $[M]_D^{27}$ | G./100 ml. | $\alpha_D^{25}$ $l=1$ | $[\alpha]_D^{25}$ | [2] $[M]_D^{25}$ |
| Acetone extract | 0.220 | +0.100° | +45.4° | +38.1° | 0.114 | +0.055° | +48.2° | +40.5° |
| Ether extract | 0.365 | +0.355° | +97.3° | +81.7° | 0.207 | +0.245° | +118° | +99.1° |
| Benzene extract | 0.595 | +0.220° | +36.9° | +30.9° | 0.108 | +0.040° | +37.0° | +31.1° |
| Extract obtained after treatment in autoclave at 280° C. for 14 hours | 0.040 | +0.035° | +87.5° | +73.5° |  |  |  |  |
| Residue after treatment in autoclave, purified by treatment wth methanol and HCl as described in the example | 0.080 | +0.090° | +112° | +94.1° |  |  |  |  |
| Residue after extraction practically insoluble in decalin |  |  |  |  | 0.017 | +0.020° | +117° | +98.3° |

[1] The final purification was carried out by prolonged boiling of the polymer under nitrogen first with conc. HCl and then with methanol, in order to remove the acidity, and the residues were finally filtered, washed with methanol and dried by heating under vacuum.
[2] The molar optical activity is referred to the molecular weight of one monomeric unit.

The optically active and the inactive poly-3-methyl-pentene-1, finally purified as described have the following melting points (determined in a capillary):

poly-3-methyl-pentene-1, obtained from the active olefin, melting point 277° C.
poly-3-methyl-pentene-1, obtained from the racemic olefin, melting point 268° C.

The X-rays examination of the two pulverized polymers showed that the optically active polymer had a much higher crystallinity than the racemic polymer.

EXAMPLE 2

1.44 g. of (+)(S)-3-methyl-pentene-1, having an optical purity of at least 90% and an $n_D^{20}=1.3845$, were sealed in a glass vial together with 0.197 g. TiCl$_4$ and 0.676 g. distilled Al(i-C$_4$H$_9$)$_3$.

The polymerization proceeded rapidly at room temperature and after about 1 hour no liquid was left in the vial.

The obtained product was purified by means of successive treatments under nitrogen with an ethereal hydrochloric acid solution and with methanol. The purified polymer weighed 0.862 g.; further 0.043 g. of polymer were obtained by evaporating the solvents used in the purification steps.

Table III shows the optical activity and the specific rotation referred to the monomeric unit, of the fraction obtained by extracting the crude polymer with different solvents.

Table III

| Fractions | Percent | G./100 ml. in C$_6$H$_6$ | $\alpha_D$ | $[\alpha]_D$ |
| --- | --- | --- | --- | --- |
| Acetone extract | 1.5 | 0.118 | +0.065° at 20° C. (1=1) | +55° |
| Ether extract | 1.8 | 0.290 | +0.365° at 20° C (1=1) | +126° |
| Iso-octane extract | 1.6 | 0.058 | +0.260° at 60° C (1=4) | +112° |
| Residue | 95.1 | | | Not det. |

2.40 g. racemic 3-methyl-pentene-1, having an $$n_D^{20}=1.3845$$

were sealed in a glass vial together with 0.325 g. TiCl$_4$ and 1.126 g. previously distilled Al(i-C$_4$H$_9$)$_3$.

The polymerization proceeded rapidly at room temperature and after 2 hours no liquid was any longer observed in the vial. The latter was then opened and the obtained product was purified by successive treatments, under nitrogen, with ethereal solutions of HCl and CH$_3$OH.

The polymer, comprising also the oily fractions dissolved in the solvents used in the purification step and recovered therefrom by evaporation and extraction with benzene, weighed 1.04 g.; said oily fractions together with the acetonic extract determined by extracting the purified polymer in a Kumagawa extractor, corresponded to 18.1% of the weight of the obtained polymer.

EXAMPLE 3

1.4 g. of (−)(S)-4-methyl-hexene-1, having an optical purity of about 90%, $n_D^{20}=1.4003$, and $[\alpha]_D^{20}=-2.52°$, were closed in a glass vial together with 0.15 g. TiCl$_3$ and 0.58 g. previously distilled triisobutyl-aluminum.

The olefin was polymerized at about 20° C. for 4 days and thereafter the vial was opened and the polymer was purified by protracted boiling with methanol and conc. HCl under nitrogen.

The purified polymer thus obtained weighed 0.67 g. It was then fractionated in a Kumagawa extractor and the optical activities of the various fractions obtained were measured. The data related to the extraction with ether and acetone are reported in Table IV.

Table IV

| Fractions | G. | Percent | [η] |
| --- | --- | --- | --- |
| Acetone extract | 0.071 | 11.3 | |
| Ether extract | 0.388 | 61.8 | [1] 1.8, [2] 2.9–3.1 |
| Residue (by difference) | 0.169 | 26.9 | [1] 7.7–9.4 |
| Purified polymer subjected to extraction | 0.628 | 100.0 | |

[1] In benzene at 20° C.
[2] In tetrahydronaphthalene at 120° C.

Table V reports the measured rotation angles and the specific and molar rotatory powers calculated therefrom for the various fractions shown in Table IV.

Table V

| Fractions | G./100 ml. | $\alpha_D^{19}$(1-2) | $[\alpha]_D^{19}$ | $[M]_D^{19}$ | Solvent |
| --- | --- | --- | --- | --- | --- |
| Acetone extract | 0.336 | +0.70° | +104° | +102° | Benzene. |
| Ether extract | 0.924 | +4.95° | +268° | +263° | Ether. |
| Residue | 0.043 | +0.24° | +279° | +275° | Benzene. |

The melting point of the residue was found to be higher than 178° C.

The optically active polymer, obtained as a residue after the extraction, exhibits, on X-ray examination, a crystallinity which is much higher than that of the racemic poly-methyl-hexene-1 having about the same melting point.

EXAMPLE 4

2.79 g. racemic 4-methyl-hexene-1, having $$n_D^{20}=1.4002$$

were sealed in a glass vial together with 0.12 g. TiCl$_3$ and 0.96 g. of previously distilled (+)-tris-[(S)-2-methyl-butyl] aluminum etherate ($[\alpha]_D^{27}=+23.89°$).

The vial was kept at room temperature (about 18° C.) for 7 days and was then heated for 41 hours at the average temperature of 90° C. After this period of time the vial was opened and the polymer was purified by prolonged boiling under nitrogen, with methanol and conc. hydrochloric acid.

The purified polymer thus obtained weighed 0.75 g. Its fractionation with ether and acetone in a Kumagawa extractor gave the results reported in Table VI.

Table VI

| Fractions | G. | Percent | [η] in tetrahydronaphthalene at 120° C |
| --- | --- | --- | --- |
| Acetone extract | 0.151 | 21.9 | |
| Ether extract | 0.198 | 28.6 | 0.56 |
| Highly crystalline residue | 0.342 | 49.5 | 2.5 |
| Purified polymer subjected to extraction | 0.691 | 100.0 | |

The acetone extract showed, in benzene $$[M]_D^{17}=+2.98°$$

(referred to the weight of the monomeric unit) and the ether extract showed, in benzene, $[M]_D^{17} = +0.5°$ (again referred to the monomeric unit).

The (+)-tris-[(S)-2-methyl-butyl] aluminum etherate used in preparing the catalyst was obtained as follows:

In a 2000 ml. flask containing ground glass and provided with a reflux condenser and a stirrer, 60.8 g. (2.5 gram-atoms) of Mg suspended in anhydrous ether were treated under nitrogen with 266 g. (2.5 mols) of (+)(S)-1-chloro-2-methyl-butane in ether solution, having $$n_D^{20} = 1.4127 \text{ and } [\alpha]_D^{20} = +1.637°$$

(optical purity 96.3%), obtained by reacting (−)(S)-2-methyl-butanol, having $[\alpha]_D^{16} = -5.75°$ (optical purity 97.4%) with thionyl-chloride.

After starting the reaction by means of a short heating at high temperature and the introduction of a small iodine crystal, the introduction of the alkyl chloride was regulated to maintain a constant slow reflux.

The final volume was of about 950 ml. The reaction was completed by protracting the agitation for 2 hours. 75.5 g. (0.566 mols) of AlCl₃ dissolved in anhydrous ether, were thus introduced into the flask. The addition of the AlCl₃ ether solution to the Grignard compound was carried out slowly while vigorously agitating the ether solution of the Grignard's compound and cooling the reaction flask with ice. When the addition was completed the agitation was continued for one hour.

From the ether solution, containing the (+)-tris-[(S)-2-methyl-butyl] aluminum etherate, the ether was evaporated under reduced pressure (the remaining traces were eliminated by slightly heating the reaction flask); petroleum ether, free of olefins (boiling point 40°–50° C.), distilled under nitrogen on sodium, was then added under stirring. After decantation, the clear layer was siphoned under pure dry nitrogen. This operation was repeated 5 times, the extracts were combined, the petroleum ether was distilled off almost completely by distillation under N₂ at the lowest possible temperature, and the last traces of the petroleum ether were then removed under reduced pressure.

The crude product yielded by vacuum distillation, the (+)-tris-[(S)-2-methyl-butyl]-aluminum etherate having a boiling point of 87–89° C. (0.6 mm. Hg) and $$[\alpha]_D^{27} = +23.89°$$

EXAMPLE 5

4.22 g. (+)(S)-5-methyl-heptene-1 having $$n_D^{25} = 1.4078 \text{ and } [\alpha]_D^{20} = +9.8°$$

were closed in a glass vial together with 0.04 g. TiCl₃ and 0.26 g. of previously distilled triisobutylaluminum. The polymerization was continued for 19 days. During that period, the vial was heated for 69 hours at an average temperature of 50° C. The vial was then opened and the polymer was purified by prolonged boiling under nitrogen with methanol and conc. hydrochloric acid.

After this treatment, 0.82 g. polymer were obtained, and then subjected to solvent extraction in a Kumagawa extractor.

The polymer appeared to consist of 33% oily low molecular weight fractions soluble in acetone; the residue was crystalline and completely soluble in ether. Table VII shows the measured rotation angles and the values of specific and molar rotation calculated therefrom, for the acetone extract and for the residue soluble in ether.

Table VII

| Fractions | G./100 ml. | $[\alpha]_D^{16}$ (1-2) | $[\alpha]_D^{16}$ | $[M]_D^{16}$ | Solvent |
|---|---|---|---|---|---|
| Acetone extract | 1.154 | +0.27° | +11.7° | +13.1° | Benzene. |
| Residue | 0.602 | +0.71° | +59.0° | +66.1° | Do. |

EXAMPLE 6

Dry propylene, under a pressure of one atmosphere, is bubbled through a mixture of 5.67 g. of the etherate of (+)-tris-[(S)-2-methyl-butyl] aluminum having an optical purity of at least 91%, and 0.55 g. of titanium tetrachloride contained in a test tube.

The tube is heated slowly up to 80° C. and kept at this temperature for 9½ hours, during which time propylene is bubbled through continuously at the rate of approximately 1 liter per hour.

At the end of this time the metallorganic compounds present in the reaction product are slowly decomposed under nitrogen by means of methanol, and the polymer is purified by repeated treatments with methanol and hydrochloric acid.

The purified, dry polymer weighs 0.398 g.; it is extracted with boiling solvents in a Kumagawa extractor.

The acetone extract (14.4% of the total) dissolved in benzene shows a specific rotation $[\alpha]_D^{15} = 3.9°$; the ether extract (11.4%) a specific rotation $[\alpha]_D^{15} = +1.9°$.

The present polymerization process can be carried out at temperatures in the range from 0° to 100° C.

In the examples illustrating our invention applied to the polymerization of optically active alpha-olefins, the catalyst used was obtained by mixing TiCl₃, respectively TiCl₄, with Al(isobutyl)₃.

It will be understood that other catalysts prepared by mixing a transition metal halide with an organometallic compound can be used.

Preferred catalysts are those obtained by mixing halides of transition metals Ti, V, or Zr, with alkyl compounds of Li, Be, Mg or Al in which the alkyl radicals contain 2 to 8 carbon atoms, or with monohalides of dialkyl Al, e.g., chlorides or bromides of dialkyl Al in which the alkyl radicals contain 2 to 8 carbon atoms.

Specific catalyst-component combinations are: TiCl₃ (or TiCl₂, or TiCl₄) with triethyl- (or tri-isobutyl)Al or with diethyl Al monochloride; VCl₃ (or VCl₄) with triethyl Al or diethyl Al monochloride, and similar combinations of ZrCl₃ or ZrCl₄.

Various changes in details may be made in practicing the invention, such as variations in the starting monomer, the catalyst used, and the solvents used for effecting the separation of the sterically differentiated macromolecules comprising the crude polymerizates. Since these and other detailed changes may be made without departing from the spirit of our invention we intend to include in the scope of the appended claims all such modifications as may be apparent to those skilled in the art from the description and examples of our invention as disclosed herein.

What is claimed is:

1. Normally solid homopolymers of alpha-olefins having the general formula $$CH_2=CHR$$

where R is selected from the group consisting of branched alkyl radicals containing from 4 to 8 carbon atoms at least one of which is an asymmetric carbon atom, and alkylaryl radicals in which the alkyl portion contains from 2 to 8 carbon atoms at least one of which is an asymmetric carbon atom, said homopolymer being characterized in consisting prevailingly of isotactic macromolecules and in exhibiting optical activity in solution.

2. A normally solid homopolymer of (+)(S)-3-methyl-pentene-1, said homopolymer being characterized in consisting prevailingly of isotactic macromolecules and in exhibiting optical activity in solution.

3. A normally solid polymer of (−)(S)-4-methyl-hexene-1, characterized in consisting prevailingly of isotactic macromolecules and in exhibiting optical activity in solution.

4. A normally solid polymer of (+)(S)-5-methyl-heptene-1 characterized in consisting prevailingly of isotactic macromolecules and in exhibiting optical activity in solution.

5. A process for producing homopolymerizates which exhibit optical activity in solution, from optically active alpha-olefins of the formula $$CH_2=CHR$$

in which R is selected from the group consisting of branched aliphatic radicals containing from 4 to 8 carbon atoms at least one of which is an asymmetric carbon atom, and alkylaryl radicals in which the alkyl portion contains from 1 to 8 carbon atoms at least one of which is an asymmetric carbon atom, which process comprises polymerizing said alpha-olefin in contact with a catalyst consisting essentially of the product obtained by mixing a halide of a transition metal selected from the group consisting of Ti, V and Zr with a substance selected from the group consisting of fully alkylated derivatives of Li, Be, Mg and Al, and dialkyl Al monohalides, and in which the alkyl groups contain from 2 to 8 carbon atoms organometallic compound of an element belonging to Groups I to III inclusive of said table.

6. The process according to claim 5, characterized in that the catalyst is obtained by starting with $TiCl_3$ and mixing the $TiCl_3$ with trialkyl aluminum.

7. The process according to claim 4, characterized in that the catalyst is obtained by starting with $TiCl_4$ and mixing the $TiCl_4$ with trialkyl aluminum.

8. The process according to claim 4, characterized in that the optically active alpha-olefin is (+)(S)-3-methyl-pentene-1.

9. The process according to claim 4, characterized in that the optically active alpha-olefin is (−)(S)-4-methyl-hexene-1.

10. The process according to claim 5, characterized in that the optically active alpha-olefin is (+)(S)-5-methyl-heptene-1.

11. A process for producing homopolymerizates which exhibit optical activity in solution from optically inactive alpha-olefins of the formula $CH_2=CHR$ in which R is selected from the group consisting of alkyl radicals containing from 1 to 8 carbon atoms, the phenyl radical, and the phenyl radical substituted by alkyl groups containing from 1 to 8 carbon atoms, which process comprises polymerizing the alpha-olefin in contact with a catalyst consisting essentially of the product obtained by mixing a halide of a transition metal selected from the group consisting of Ti, V and Zr with an optically active organometallic compound having the formula $$MeR'n$$

in which Me represents a metal selected from the group consisting of Li, Mg, Be and Al, $n$ is a whole number corresponding to the valence of the metal Me, and R' is a hydrocarbon radical containing at least one asymmetric carbon atom and selected from the group consisting of 2-methyl-n-butyl, 3-methyl-n-pentyl, 3-phenyl-n-pentyl, 4-methyl-n-hexyl, and 5-methyl-n-heptyl.

12. The process according to claim 11 characterized in that the catalyst is obtained by mixing a titanium halide with optically active (+)-tris-[(S)-2-methyl butyl]-aluminum etherate.

References Cited by the Examiner

FOREIGN PATENTS 526,101   5/55   Italy.
549,891   7/56   Italy.

OTHER REFERENCES

Gaylord et al., Linear and Stereoregular Addition Polymers (1959), pages 40–44, Interscience Publishers Inc., New York.

Gaylord et al., Linear and Stereoregular Addition Polymers, Interscience Publishers Inc., New York, pages 133 and 220.

Arcus, J. Chem. Soc., 1957, pages 1189–96, pages 1194–96 only needed.

Beredjick et al., J. Am. Chem. Soc., vol. 80, pages 1933–38 (1958).

JOSEPH L. SCHOFER, *Primary Examiner.*

LESLIE H. GASTON, WILLIAM H. SHORT,
*Examiners.*

UNITED STATES PATENT OFFICE
CERTIFICATE OF CORRECTION

Patent No. 3,193,544                                July 6, 1965

Giulio Natta et al.

It is hereby certified that error appears in the above numbered patent requiring correction and that the said Letters Patent should read as corrected below.

Column 1, line 11, for "process" read -- processes --; line 63, for "rotary" read -- rotatory --; column 3, line 30, for "3.38 g. Al(i=$C_4H_9$)$_3$" read -- 3.38 g. Al(i-$C_4H_9$)$_3$ --; line 36, for "Al(i=$C_4H_9$)$_3$/TiCl$_3$" read -- Al(i-$C_4H_9$)$_3$/TiCl$_3$ --; columns 3 and 4, Table II, sub-heading to the third column, for $$\alpha_D^{25} \quad 1=1$$

read $$\alpha_D^{27} \quad 1=1$$

column 8, lines 68 and 72, for "polymer", each occurrence, read -- homopolymer --; column 9, lines 18 to 20, strike out "organometallic compound of an element belonging to Groups I to III inclusive of said table".

Signed and sealed this 16th day of August 1966.

(SEAL)
Attest:

ERNEST W. SWIDER                                         EDWARD J. BRENNER
Attesting Officer                                           Commissioner of Patents